United States Patent [19]

Golze

[11] 4,351,500
[45] Sep. 28, 1982

[54] SKI/FLOAT LANDING GEAR APPARATUS FOR AIRCRAFT

[76] Inventor: Richard R. Golze, 637 Kingsley Trail, Bloomfield Hills, Mich. 48013

[21] Appl. No.: 169,614

[22] Filed: Jul. 17, 1980

[51] Int. Cl.³ .............................................. B64B 25/56
[52] U.S. Cl. .................... 244/105; 244/207; 114/67 A; 114/283; 114/292
[58] Field of Search ............... 244/100 R, 100 A, 101, 244/102 R, 105–108, 207, 208, 209; 114/290, 67 A, 283, 292, 61; 180/124, 125; 417/182; 9/2 A

[56] References Cited

U.S. PATENT DOCUMENTS

| | | | |
|---|---|---|---|
| 955,703 | 4/1910 | Seffergren | 114/67 A |
| 1,693,773 | 12/1928 | Anderson | 244/105 |
| 2,062,384 | 12/1936 | White et al. | 114/67 A |
| 2,191,724 | 2/1940 | Newton | 417/182 |
| 2,361,293 | 10/1944 | Jeffries | 244/105 |
| 2,364,845 | 12/1944 | Glen | 244/105 |
| 2,399,346 | 4/1946 | Hall et al. | 244/105 |
| 2,429,992 | 11/1947 | Gispell | 244/105 |
| 2,444,264 | 6/1948 | Morris | 244/101 |
| 2,507,913 | 5/1950 | Lanser | 244/105 |
| 2,643,835 | 6/1953 | Janney | 244/105 |
| 2,645,436 | 7/1953 | Brown | 244/102 R |
| 2,853,307 | 9/1958 | Dombrowski | 244/108 |
| 3,506,222 | 4/1970 | Anderson | 244/105 |
| 3,507,466 | 4/1970 | La Fleur | 244/105 |
| 3,636,907 | 1/1972 | Scarriff, Sr. | 114/283 |

Primary Examiner—Galen L. Barefoot

[57] ABSTRACT

A ski/float landing gear is flexibly constructed of a resin reinforced with fiber. The ski/float has a pneumatically inflatable upper member, which is molded to fall to a flat shape when deflated. Engine exhaust gases are used to inflate and deflate the float. Air discharged from the lower side of the ski portion provides a boundary layer effect. The use of engine exhaust gases gives the ski element a rapid thaw capability in freezing weather.

3 Claims, 12 Drawing Figures

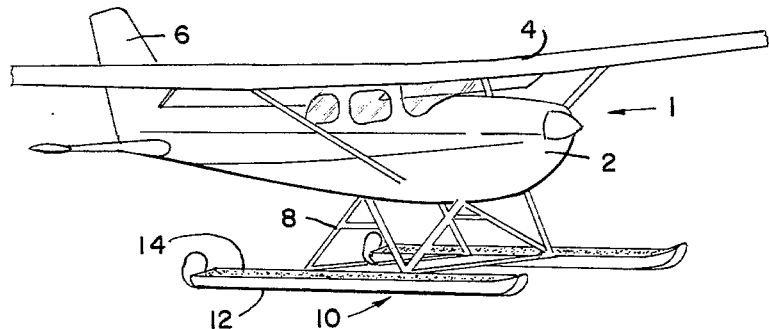
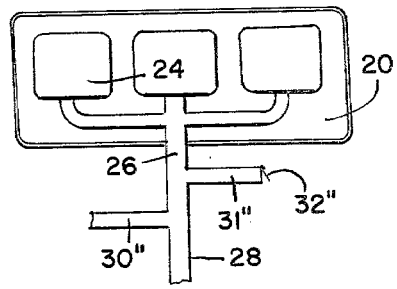
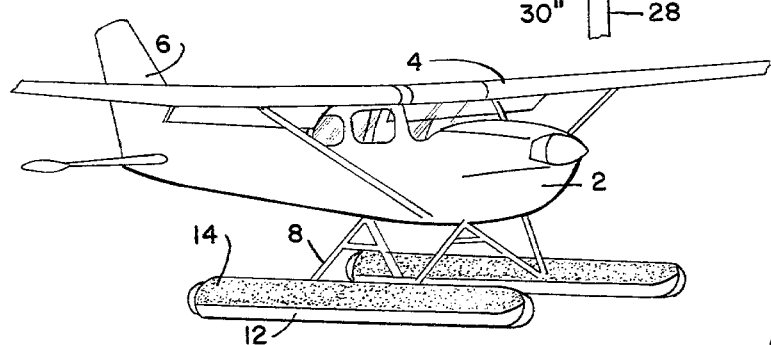
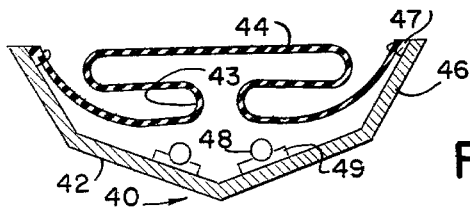
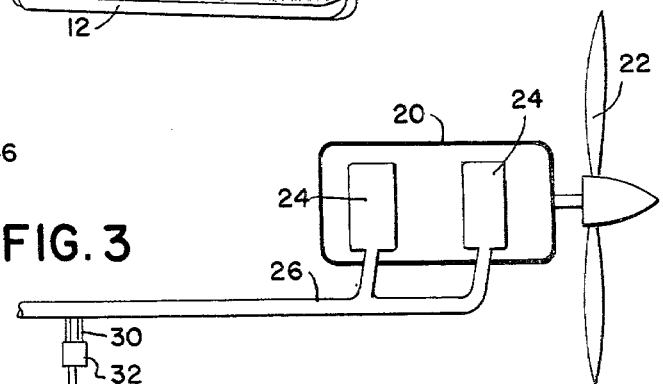
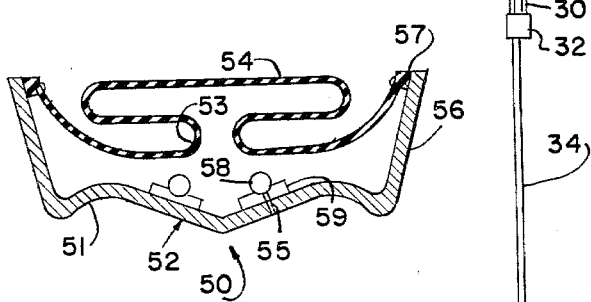
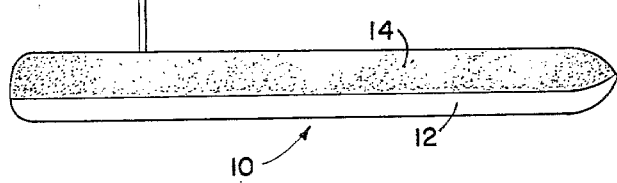

3,351,500

SKI/FLOAT LANDING GEAR APPARATUS FOR AIRCRAFT

BACKGROUND OF THE INVENTION

The invention relates to the use of the skis on floats in the aircraft landing gear. Takeoff speeds of conventional floats typically associated with aircraft are encountered by drag of floats on water and by airborne drag.

A preliminary search in the United States Patent and Trademark Office included United States and foreign patents in Class 244, Aeronautics, Subclasses 100A. 101, 105, 106 and 108.

As a result of the search the following U.S. Patents were uncovered:
U.S. Pat. Nos. 1,285,230, 1,689,807, 1,698,808;
U.S. Pat. Nos. 1,817,047, 1,963,630, 2,062,384;
U.S. Pat. Nos. 2,064,674, 2,306,269, 2,340,080;
U.S. Pat. Nos. 2,345,140, 2,345,143, 2,364,845;
U.S. Pat. No. 2,375,973, 2,399,346, 2,444,264;
U.S. Pat. Nos. 2,507,913, 2,991,745, 3,190,587;
U.S. Pat. Nos. 3,599,903, 4,027,835.

A number of patents are directed to inflatable type floats. However, none of the prior art discloses the specfic elements of the present invention.

U.S. Pat. No. 1,285,230 describes a geometry for distribution of load, by mechanical means, over the float.

U.S. Pat. No. 1,689,807 relates to means of manual extension of a rigid ski below a float for landing on snow or ice. Current rigid aluminum aircraft floats have sufficient integrity to permit occasional snow and ice landings and take offs. The problem with rigid hull-like floats is that concentrated loads shear or loosen rivets which permit leakage on subsequent return to water operation.

U.S. Pat. No. 1,698,808 relates to a ski with a streamlining metal cap to improve airborne efficiency.

U.S. Pat. No. 1,817,047 uses a selective blast of compressed air to break surface tension just prior to lift off. This patent also identifies the possible use of engine exhaust gas.

U.S. Pat. No. 1,963,630 relates to a means of positioning the attitude of the aircraft with respect to landing gear and also contains retractable wheels and a shock absorbing mechanism between the airframe and the floats.

U.S. Pat. No. 2,062,384 uses compressed air or exhaust gas discharged parallel to the hull surface so as to break the relationship between hull and water.

U.S. Pat. No. 2,064,674 relates to a means of absorbing shock between float and airframe.

U.S. Pat. No. 2,306,269 uses a mechanical mechanism to collapse an elastomeric housing and also describes a collapsible and retractable wing tip float.

U.S. Pat. No. 2,340,080 describes a specific geometry of a rigid ski shape for aerodynamic characteristics.

U.S. Pat. No. 2,345,140 has a means of providing heated air to the atmosphere or the inlet of the engine supercharger.

U.S. Pat. No. 2,345,143 relates to a mechanical means of expanding or contracting a float to either provide additional floatation or better aerodynamic air flow.

U.S. Pat. No. 2,364,845 refers to a vertical lifting effect on the hull through a pneumatic effect. I do not see how this is possible without providing some confinement for the air. The typical vee shape of the hull would let air escape up the sides—as shown in FIG. 3. No mention is made of breaking surface tension.

A question exists as to how much of a pneumatic cushioning effect for absorbing shock would be achieved with the relatively small volume of air that would be discharged through the floats or hull. This patent further refutes the potential of boundry layer control by stating at page 2, lines 9–13 that as soon as the hull is clear of the water, the control valve is closed by the pilot.

U.S. Pat. No. 2,375,973 describes a triangular geometry of a truss inside a pneumatic float to function as a load carrying member.

U.S. Pat. No. 2,399,346 discloses a retractable top deck as part of a rigid hull along with a mechanical retraction method.

U.S. Pat. No. 2,444,264 describes the use of mechanically actuated doors folding a pneumatically deflated float to provide minimum frontal area.

U.S. Pat. No. 2,507,913 has a permanently inflated gas bag of polyolefin resin which functions as a resilient float which may be more resistant to damage in striking the water on landing than other floats.

U.S. Pat. No. 2,991,745 describes a water ski with a rigid slotted nose which may reduce spray formed during emergence.

U.S. Pat. No. 3,190,587 discloses an inflatable means to change the hull shape for maximum efficiency. The inflatable bag smooths lines of a hydrodynamic hull configuration to the smooth shape required for efficiency as an aerodynamic body.

U.S. Pat. No. 3,599,903 describes a float with a high length/beam ratio hull for minimum drag with minimal volume for floatation. The hull is nearly submerged at rest. Rapid lift from water is obtained by a supercavitating hydrofoil.

U.S. Pat. No. 4,027,835 describes the use of a combination rigid hydrofoil/wheel configuration in combination with a rigid demountable boat hull which functions as a displacement member to provide floatation.

SUMMARY OF THE INVENTION

The present invention uses a compliant flexible ski-like member as the load carrying member. This ski permits operation from surfaces which have irregularities which would cause structural damage to rigid bodies such as state of the art floats. The ski is a member of high aspect or length to beam ratio. This ratio may be as high as 40:1. As such it has improved aerodynamic performance as compared to a rigid float. The flexible ski is compliant to the more dense surfaces and has no rivets or plates to permit water leakage.

Another feature of the invention is the use of engine exhaust to melt ice or snow if the ski is frozen to the surface or to prevent freezing upon landing with the intent of a near term take off.

An improved aerodynamic effect is achieved by the discharge of air or gas to provide a boundry layer effect. This is particularly effective at lower speeds where drag reduction could be critical to sustaining flight. Means of accomplishing continuous boundry layer control and selective inflation and deflation of the inflatable member are described herein.

The present ski uses a continuous application of forced air or exhaust gas to reduce water surface tension. A further embodiment is the boundry layer effect of aerodynamic streamlining or drag reduction while in flight. A further benefit of the present ski is the resistance to freezing between the ski and its contact surface due to the heat energy in the gas.

The requirement to support an aircraft with displacement of floats has bodies which have significant cross sectional areas. Although some aerodynamic streamlining is possible, the frontal area of floats imposes a significant aerodynamic drag. Top speed of a typical aircraft on wheels is 148 knots. This speed reduces to 128 knots on floats, a 14% degradation in performance. It is known that a comparable aircraft with snow skis has essentially the same speed/performance as when it is equipped with wheels.

The present ski/float embodies a ski-like member of small frontal area. The ski-like member is constructed of an elastic material, such as a resin reinforced with fiber glass, ceramic, carbon or other fibers or a filled thermoset composite. Flexible construction optomizes weight and minimizes damage in the event of impact with rigid objects. The compliant nature of the semiflexible member permits some deflection which allows riding over objects or obstructions without destruction of the ski/float.

The ski/float has a pneumatically inflatable upper member. This member preferably is a rubberized fabric which is molded to fold to a flat shape when deflated. The inflatable member provides floatation while the aircraft is landing, taking off, taxiing or at rest on water.

There is disclosed herein a three way means of using engine exhaust gas to inflate or deflate the float. Preferably ram exhaust gas is directed to the float to inflate it. Repositioning a three way valve causes the exhaust gas to evacuate the float and collapse it for low frontal area. A similar means of selectively inflating and deflating the float uses a venturi in the exhaust stack. The three way valve will work if an engine or electric driven air pump is employed. The three way valve can be positioned to provide air pressure to inflate the float. Positioning the three way valve to its opposite position causes the inlet of the pump to be connected to the floats to deflate the floats.

Low pressure in the float provides a major deterrent to tearing. If a sharp object is brought into contact with the inflated member, the low pressure compliance of the float causes a deflection, with subsequent resistance to damage.

A boundary layer control effect is achieved by using a series of air discharge passages in the bottom surface of the ski. One of the problems with float plane take-off is associated with breaking the surface tension of the water. A forced stream of air bubbles from the floats of the present invention and results in a significant shortening of the takeoff run. This feature is equally applicable to current rigid aluminum floats. An adhesion problem exists with ski landing on mud flats. The discharge of air provides a boundary layer effect which helps here also.

A problem associated with operating from just freezing mud or snow is freezing the ski to the surface when the plane is at rest. In the present invention, when engine exhaust gas is used, rapid thaw occurs.

Intrusion of water, into the float, when the aircraft engine is not operating, is prevented by check valves which automatically seat when the air or exhaust pressure drops below a certain level. The exhausting of air through the ski/float provides an automatic bilge pump effect. Current float design requires manual pumping of each floatation compartment. If the air source fails, the aircraft can be landed on the skis. It will remain on the surface just as a water skier stays on the surface while he has the forward motion. The pilot would taxi up on the beach to prevent sinking. The design of the inflatable member in one embodiment is such that it automatically springs to an open position in the event of air pressure failure. This is accomplished mechanically. The elastomeric top section is molded in the open position. Memory causes it to stay in the open position if air pressure fails. The molded shape would have creases molded along the longitudinal axis to insure proper folding when air is evacuated. This is a safety measure.

An aircraft ski float of the present invention has a high aspect ratio, and has a long flexible resilient base made of polymeric material. A long, thin floatation bag is joined to lateral extremeties of the base and extends longitudinally on the base. Valves selectively inflate and deflate the bag. The base is a thin shell having a bottom portion and upward extending sides terminated in upward lateral extremeties, and the bag is a long flexible sheet having lateral extremeties connected to lateral extremeties of the base.

Preferably, the base has a central downward pointed V-shaped apex. Portions of the base slope upward and outward from the apex, and sidewalls of the base extend upward from outward extremeties of the base portions and slope upward at greater angles than the base portions. Downward extended curvilinear side portions connect the sidewalls and base portions and which extend longitudinally along the base.

In one embodiment, the base has a flat central portion with downward extending rounded portions joining the central portion and sidewall portions of the base.

Preferably the base has plural openings extending therethrough, and a source of pressurized gas is connected to the openings for exhausting gas downward through the openings to create a boundary layer effect.

Typically, the source of pressurized gas is aircraft engine exhaust. Preferably, the exhaust fills the bag and escapes through the openings via check valves, which prevent reverse flow of fluid through the openings.

In one other embodiment the base has double upper and lower walls. A space between the walls act as a gas-conducting channel. Openings extend downward through the lower wall from the gas conducting channel.

These and other and further objects and features of the invention are apparent in the disclosure which includes the drawings and the specification, with the above and ongoing description and the claims.

BRIEF DESCRIPTION OF THE DRAWINGS

FIG. 1 shows an aircraft with floats deflated to a ski or cruise mode.

FIG. 2 shows an aircraft with skis inflated to a float mode for water operation.

FIG. 3 is a schematic detail of a connection between an exhaust line and inflatable float for inflating and deflating float.

FIG. 3C is a schematic detail of a float inflation means.

DETAILED DESCRIPTION OF THE DRAWINGS

Figure 6:
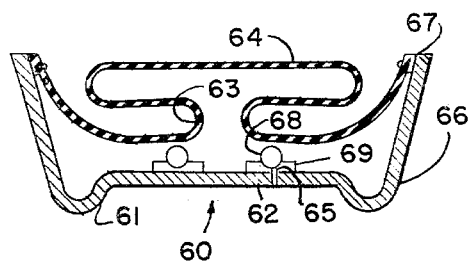

Referring to FIGS. 1 and 2, and aircraft is generally indicated by numeral 1. Fuselage 2 mounts a high wing 4 and an empennage 6 which consists of the vertical and horizontal stabilizers, fin, rudder and elevators, as is conventional. Struts 8 are connected to float assembly generally indicated by the numeral 10. Rudders are provided at the rear of each float. Each float includes a resilient base 12 and a flexible upper bag 14. Bag 14 may be deflated as shown in FIG. 1 to a ski or flying condition and may be inflated as shown in FIG. 2 to a water landing configuration.

Figure 3A:
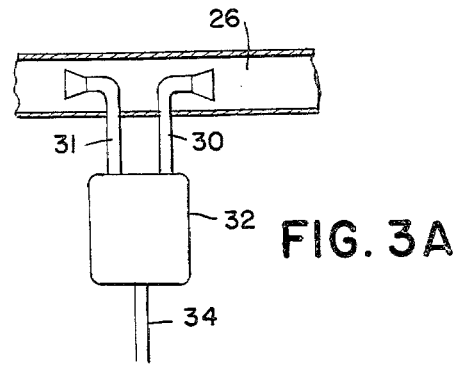
FIG. 3A is a schematic detail of a float inflation and deflation means.

Preferably the floats are inflated or deflated using pressure differentials created in the exhaust line of an engine. In FIG. 3 the main engine 20 which drives propeller 22 has one or more exhaust manifolds 24 which are connected to an exhaust line 26. Lines 30 connect exhaust line 26 to a three-way valve 32 which connects to supply line 34, which communicates with bag 14. As shown in FIG. 3A, a conventional three-way valve 32 may selectively connect either line 30 or 31 with supply line 34. When line 30 is connected with line 34, the exhaust pressure from line 26 is supplied to line 34, for inflating the floats. When valve 32 connects line 31 to line 34, exhaust gas flowing through line 26 withdraws gas through line 34, deflating the floats.

Figure 3B:
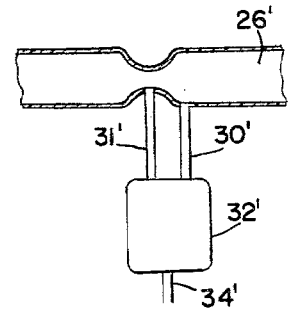
FIG. 3B is a schematic detail of a float inflation and deflation means.

As shown in FIG. 3B exhaust line 26' has a venturi. Line 30' is connected to an upstream side of the venturi, while line 31' is connected to the reduced pressure throat area of the venturi. When valve 32' connects line 30' to supply line 34' exhaust gas under pressure is supplied to inflate the float. When valve 32' connects exhaust line 31' with supply line 34' gas is flowed from the float to deflate the float.

As shown in FIG. 3C, spur line 31" has a relief valve 32" which opens at a predetermined pressure, for example 20 pounds per square inch to maintain pressure constant in exhaust pipe 28. Line 30" supplies exhaust gas under constant pressure to the float inflation system.

FIGS. 4, 5 and 6 show preferred float cross-sections. Float 40 has a base 42 made of a fiber reinforced resin which is tough and resilient. An upper floatation bag 44 is made of rubber or similar material and is joined to the base along upper level extremeties 47 of side walls 46. Lateral portions 43 of bag 44 have a permanent inward set, so that they fold inward as bag 44 is deflated. A plurality of valves 48 mounted on bases 49 provide boundary layer air through openings which are described with reference to later embodiments.

As shown in FIG. 5, a float 50 has a V-shaped base 52 with portions leading upward from a central apex. Downward rounded edge portions 51 connect the V-shaped bottom portions 52 and sidewall portions 56 of the base. Flexible bag 54 folds inward at central portions 53 and is joined at 57 to upper edges of the sidewall portions 56 of the base. Check valves 58 mounted on blocks 59 permit gas to flow outward through channels 55 to lubricate the base 52 with air and to provide a boundary layer effect.

Figure 6A:
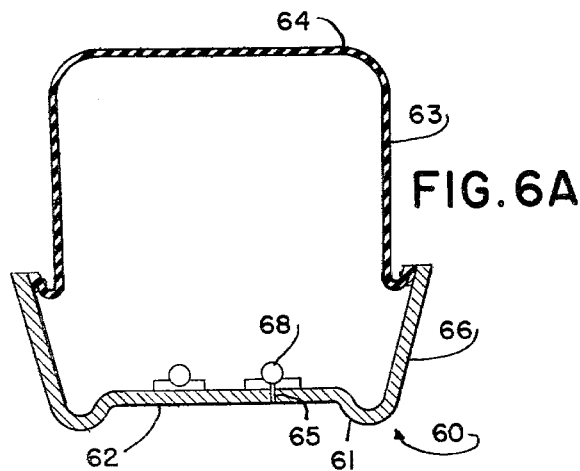

Float 60 as shown in FIGS. 6 and 6A has downward rounded portion 61 which interconnect flat base 62 and the sidewall portions 66 of the base. Lateral portion 63 of rubber bag 64 fold inward when the float is deflated as shown in FIG. 6. Lateral edges of the bag 64 are joined to upper lateral edges 67 of the sidewall portions 66 of the base. The deflated profile shown in FIG. 6 is suitable for cruising and for landing on ice and mud and rough surfaces. The inflated condition shown in FIG. 6A is suitable for landing on water. Gas released through check valves 68 on block 69 flows through channels 65 to lubricate the bottom 62 of the base. Edges 61 entrap the gas to form an imprisoned lubricating layer of air which provides a boundary layer effect.

Figure 7:
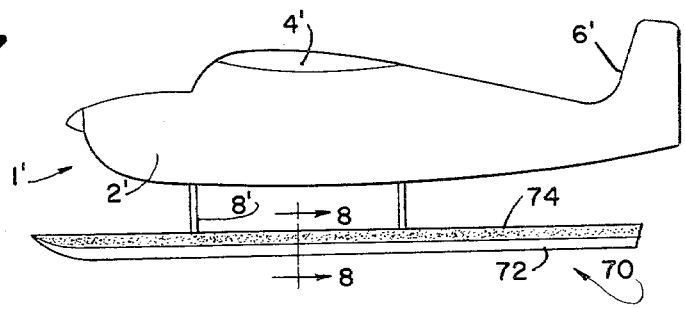
Figure 8:
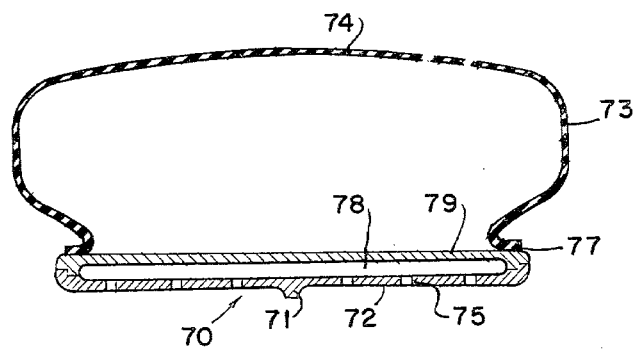

As shown in FIGS. 7 and 8 aircraft 1' has fuselage 2', wings 4' and an empennage 6'. Struts 8' mount a float/ski 70, which has a base 72 and an upper bag 74.

FIG. 8 is a cross section along 8—8 of FIG. 7. Ski 70 has a double wall base with an upper wall 79 and a lower foraminous wall 72 with openings 75. Exhaust gas flows through channel 78 between 72 and 79 and out through openings 75 to lubricate the base of the ski/float and to provide a boundary layer effect. Bag 74 may be filled with the same gas which flows through channel 78, or bag 74 and channel 78 may be filled with gas at varying pressures. Bag 74 is attached to the base 72 at lateral edges 77. Sides 73 of bag 74 have an inward folding memory to cause the bag to be folded neatly above wall 79 when the bag is deflated for cruising or landing on soft surfaces.

While the invention has been described with reference to specific embodiments, it will be obvious to those skilled in the art that modification and variations of the invention may be made without departing from the scope of the invention. The scope of the invention is defined in the following claims.

I claim:

1. An aircraft ski float having a high aspect ratio, and having a long flexible resilient base made of polymeric material and having a long, thin floatation bag joined to lateral extremities of the base and extending longitudinally on the base, and means to selectively inflate and deflate the bag, said base comprises a thin shell having a bottom portion and upward extending sides terminated in upward lateral extremities and wherein the bag comprises a long flexible sheet having lateral extremitie connected to said upward lateral extremities of the base, said bottom portion has a central downward pointed V-shaped apex and wherein portions of the bottom portion slope upward and outward from the apex and wherein said sides extend upward from outward extremities of the base portion and slope upward at greater angles than the base portion, said bottom having flat central portions joining on either side of said V-shaped apex and further including downward extending rounded portions joining the said flat central portions and said sidewall portions of the base, plural openings in said base extending therethrough, and wherein an aircraft engine exhaust line is connected to the openings for exhausting gas downward through the openings to create a boundary layer effect, said engine exhaust inflates the bag and the base and then escapes through the openings via check valves which prevent reverse flow of fluid through the openings when the bag is deflated via said deflative means.

2. The apparatus of claim 1 wherein the means for inflating and deflating comprises valve means and means to connect the valve means to the float.

3. The apparatus of claim 2 wherein the valve means having first and second lines connected to the exhaust line and having a third line connected to the float and means for selectively coupling the first line with the third line and the second line with the third line and wherein the first line is connected to the exhaust line in a manner to provide gas pressure in the first line from the exhaust line and wherein the third line connected to the exhaust line in a manner to exhaust the third line into the exhaust line with gas pressure flowing through the exhaust line.

* * * * *